March 21, 1933.                J. TUTEUR                1,902,472
                        HANDLE FOR VACUUM CLEANERS
                           Filed July 21, 1930
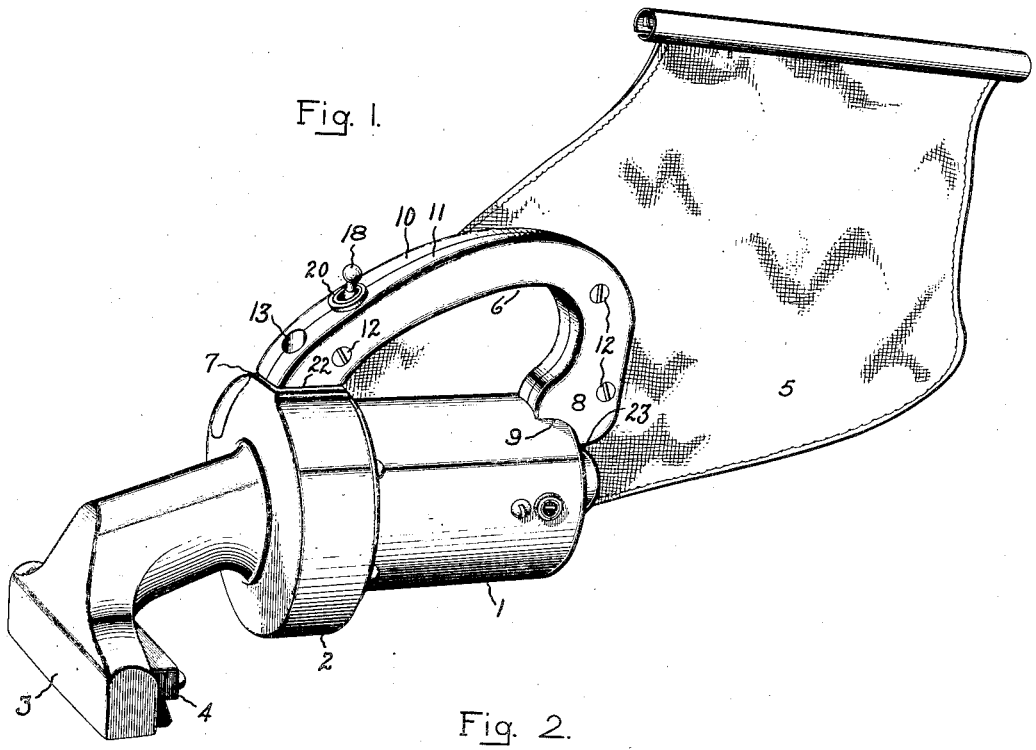
Fig. 1.
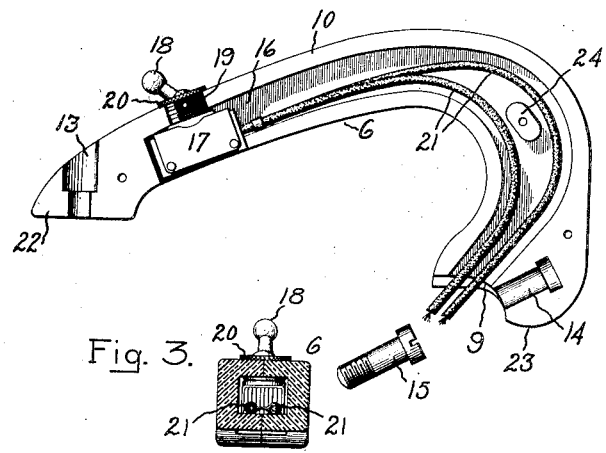
Fig. 2.
Fig. 3.
Inventor:
Julius Tuteur,
by Charles E. Tullar
His Attorney.

Patented Mar. 21, 1933

1,902,472

UNITED STATES PATENT OFFICE

JULIUS TUTEUR, OF CLEVELAND, OHIO, ASSIGNOR TO ELECTRIC VACUUM CLEANER COMPANY, INC., OF CLEVELAND, OHIO, A CORPORATION OF NEW YORK

HANDLE FOR VACUUM CLEANERS

Application filed July 21, 1930. Serial No. 469,509.

My invention relates to handles for small vacuum cleaners, such as are used for cleaning upholstery, coverings, automobile cushions and the like, and has for its object the provision of an improved construction for this purpose.

For a consideration of what I believe to be novel and my invention, attention is directed to the accompanying description and the claims appended thereto.

In the drawing, Fig. 1 is a perspective view of a motor driven vacuum cleaner provided with a handle embodying my invention; Fig. 2 is a longitudinal section of the handle showing the small switch for controlling the motor mounted therein; and Fig. 3 is a transverse section of the handle.

In making handles of this type it is important to provide a structure which is comfortable when gripped, simple, cheap to construct, light and strong, and readily assembled.

Referring to the drawing, 1 indicates a casing having mounted therein a suitable motor which drives a suction fan enclosed by the casing or housing 2 which is adapted to be fastened to the motor casing by screws. To the fan casing is connected a suction nozzle 3, which is provided on its rear lip with a brush 4. Dust or other foreign matter from the surface being cleaned is drawn into the nozzle 3 by the action of the fan and is discharged into a dust bag or receptacle 5. The elements thus far described are old and well-known and their specific construction is not material.

6 indicates the handle by means of which the cleaner is moved about. It is so shaped and positioned as to give a proper balance to the cleaner when grasped by the hand of the user. The front end of the handle rests on and is secured to a flattened surface or pad 7. From this point the handle is inclined upwardly on a curve of large radius and is then curved downwardly and sharply on a much smaller radius. At its rear and lower end the handle is provided with an enlargement 8 having a curved surface or seat 9 on its under side which is shaped to conform to the contour of the motor casing at this point.

The handle is made of two counterpart members 10 and 11, the plane of division being longitudinal. When the members are assembled or united they form a handle which is rectangular in cross-section, as shown in Fig. 3, said section gradually increasing in area from the front to the rear end. The parts of the handle are united by transverse screws 12, of which three are shown. At the front end is a socket 13 arranged to receive a screw for fastening said end to the fan casing. The rear end of the handle is also provided with a socket 14 which is so shaped as to receive a headed screw 15 that is screwed into the rear end of the motor casing. When the members are assembled this screw is concealed from view.

The handle is made of molded insulating material which may be of any suitable character, and of which many kinds are available, those containing a phenolic condensation product as a binder being the best. The handle should be tough and not easily broken due to the relatively rough usage to which these cleaners are sometimes subjected.

With vacuum cleaners it is necessary to have a switch for controlling the circuit of the driving motor, and it is important to so arrange the switch that the circuit wires extending between it and the motor are entirely concealed and protected from injury. It is also important to have the switch in such position that the user can operate it with one finger of the hand which grasps the handle. It is also important that the switch be securely fastened in place. To this end the handle is made hollow, and in the space or longitudinal channel 16 thus formed is located at the front end a snap switch 17 of suitable construction. The switch in this case has a rectangular body which is clamped between or otherwise held by the members and an actuator 18 which projects above the top surface of the handle. It also has a neck 19 which projects through the top of the handle. This neck is or may be clamped between the members to assist in holding the switch in place. If desired, a small nut 20 may be screwed on to the neck as an additional securing means. The wires 21 from the switch extend through the channel to the rear and open end and enter the motor through an opening in the casing registering with the end of the channel. As a result of this arrangement no part of the current carrying wires in the region of the handle are exposed and hence all danger of injury to the insulation thereof is avoided. The front and rear ends of the handle members have relatively large flat bearing surfaces 22 and 23 through which certain of the screws 12 extend. To prevent the side walls of the handle from collapsing when the central screw 12 is seated, both members are provided with registering projections 24, each being located within the half channel formed therein and terminating in the plane of division of the members. The channel 16 is purposely made larger than is necessary to receive the circuit wires so as to take care of any slack in the wires 21 to avoid the necessity of cutting the wires to exact length.

In assembling the parts the switch with its wires or leads 21 is first connected to the motor, then the halves of the handle are brought together with the wires located in the channel and the switch in the proper position. The screws 12 are then seated, which not only secures the rear end of the handle by causing it to envelop the screw 15 but clamps the switch as well. After this is done the front screw similar to 15 is inserted in the socket 13 and screwed into place.

The usual flexible cord for connecting the cleaner with a source of supply may be attached to the motor casing.

What I claim as new and desire to secure by Letters Patent of the United States, is:—

A handle adapted to be secured to the upper side of a motor driven vacuum cleaner for sustaining its weight when in use, and comprising a pair of counterpart members extending longitudinally of the cleaner and defining between them an elongated channel, the front end of said channel having walls arranged to form a clamping means, seats formed at both ends of the handle for engagement with the cleaner, a switch held by said clamping means, circuit wires extending from the switch through the channel and one of the seats into the cleaner whereby they are fully protected and concealed from view, and means for securing both ends of the handle to the cleaner.

In witness whereof, I have hereunto set my hand this 16th day of July, 1930.

JULIUS TUTEUR.